(12) United States Patent
Clerk et al.

(10) Patent No.: US 12,373,721 B2
(45) Date of Patent: Jul. 29, 2025

(54) CONTROLLED PHOTON FOCK STATE GENERATION USING ARBITRARILY WEAK PHOTONIC NONLINEARITIES

(71) Applicant: The University of Chicago, Chicago, IL (US)

(72) Inventors: Aashish Clerk, Chicago, IL (US); Andrew Lingenfelter, Chicago, IL (US)

(73) Assignee: The University of Chicago, Chicago, IL (US)

( * ) Notice: Subject to any disclaimer, the term of this patent is extended or adjusted under 35 U.S.C. 154(b) by 367 days.

(21) Appl. No.: 18/161,569

(22) Filed: Jan. 30, 2023

(65) Prior Publication Data
US 2023/0267361 A1    Aug. 24, 2023

Related U.S. Application Data

(60) Provisional application No. 63/312,461, filed on Feb. 22, 2022.

(51) Int. Cl.
*G06N 10/40*    (2022.01)

(52) U.S. Cl.
CPC .................................. *G06N 10/40* (2022.01)

(58) Field of Classification Search
CPC ... G06N 10/40; G02F 1/3511; G02F 2201/17; H04B 10/70
See application file for complete search history.

(56) References Cited

U.S. PATENT DOCUMENTS

| | | | | |
|---|---|---|---|---|
| 2008/0231837 A1* | 9/2008 | Ichimura | ................ | G06N 10/40 977/902 |
| 2010/0321117 A1* | 12/2010 | Gan | .......................... | H03L 7/26 331/3 |
| 2021/0279624 A1* | 9/2021 | Oliver | .................... | G06N 10/40 |
| 2022/0155621 A1* | 5/2022 | Miao | ..................... | G02F 1/0344 |
| 2023/0314374 A1* | 10/2023 | Miao | ....................... | G01N 27/82 702/38 |

OTHER PUBLICATIONS

Aspelmeyer, M. et al.; "Cavity optomechanics", Rev. Mod. Phys. 86, 1391 (2014) (62 pages).
Bamba, M. et al.; "Origin of Strong photon antibunching in weakly nonlinear photonic molecules", Rev. A 83, 021802 (2011) (4 pages).
(Continued)

*Primary Examiner* — Quan Tra
(74) *Attorney, Agent, or Firm* — Crowell & Moring LLP

(57) ABSTRACT

A method and system that harnesses extremely weak Kerr-type nonlinearities in a single driven cavity to deterministically generate single photon Fock states, and more general photon-blockaded states are disclosed. The disclosed scheme is effective even for nonlinearities that are much smaller than photonic loss in the cavity. The disclosed scheme generates photon-blockade states that are non-Gaussian, exhibit a sharp cut-off in their photon number distribution, and can be arbitrarily close to, for example, a single-photon Fock state. This scheme relies only standard linear and parametric drives, and are hence compatible with a variety of different photonic platforms.

20 Claims, 10 Drawing Sheets

(56) References Cited

OTHER PUBLICATIONS

Birnbaum, K. M. et al.; "Photon blockade in an optical cavity with one trapped atom", Nature 436, 87 (2005) (4 pages).
Eisaman, M. D. et al.; "Invited Review Article: Single-photon sources and detectors", Review of Scientific Instruments 82, 071101 (2011) (26 pages).
Faraon, A. et al.; "Coherent generation of non-classical light on a chip via photon-induced tunnelling and blockade", Nature Physics 4, 859 (2008) (5 pages).
Flayac, H. et al.; "Input-output theory of the unconventional photon blockade", Phys. Rev. A 88, 033836 (2013) (7 pages).
Flayac, H. et al.; "Unconventional photon blockade", Phys. Rev. A 96, 053810 (2017) (13 pages).
Gerace, D. et al.; "Unconventional photon blockade in doubly resonant microcavities with second-order nonlinearity", Phys. Rev. A 89, 031803 (2014) (5 pages).
Grimm, A. et al.; "Stabilization and operation of a Kerr-cat Qubit", Nature Publishing Group 584, 1 (2020) (7 pages).
Guo, X. et al.; "All-Optical Control of Linear and Nonlinear Energy Transfer via the Zeno Effect", Phys. Rev. Lett. 120, 203902 (2018) (6 pages).
Hou, K. et al.; "Interfering pathways for photon blockade in cavity QED with one and two qubits", Phys. Rev. A 100, 063817 (2019) (8 pages).
Huber, J. S. et al.; "Spectral Evidence of Squeezing of a Weakly Damped Driven Nanomechanical Mode", Phys. Rev. X 10, 021066 (2020) (11 pages).
Ikeda, K. et al.; "Thermal and Kerr nonlinear properties of plasma-deposited silicon nitride/ silicon dioxide waveguides", Opt. Express 16, 12987 (2008) (8 pages).
Imamoglu, A. et al.; "Strongly Interacting Photons in a Nonlinear Cavity", Phys. Rev. Lett. 79, 1467 (1997) (4 pages).

Lemonde, M.-A. et al.; "Antibunching and unconventional photon blockade with Gaussian squeezed states", Phys. Rev. A 90, 063824 (2014) (11 pages).
Liew, T. C. H. et al.; "Single Photons from Coupled Quantum Modes", Phys. Rev. Lett. 104, 183601 (2010) (4 pages).
Lu, J. et al.; "Toward 1% single-photon anharmonicity with periodically poled lithium niobate microring resonators", Optica 7, 1654 (2020) (6 pages).
Puri, S. et al.; "Bias-preserving gates with stabilized cat qubits", Science Advances 6, eaay5901 (2020) (15 pages).
Roberts, D. et al.; "Driven-Dissipative Quantum Kerr Resonators: New Exact Solutions, Photon Blockade and Quantum Bistability", Phys. Rev. X 10, 021022 (2020) (27 pages).
Sarma, B. et al.; "Unconventional photon blockade in three-mode optomechanics", Phys. Rev. A 98, 013826 (2018) (7 pages).
Snijders, H. et al.; "Observation of the Unconventional Photon Blockade", Phys. Rev. Lett. 121, 043601 (2018) (5 pages).
Tsang, H. K. et al.; "Nonlinear optical properties of silicon Waveguides", Semicond. Sci. Technol. 23, 064007 (2008) (10 pages).
Vaneph, C. et al.; "Observation of the Unconventional Photon Blockade in the Microwave Domain", Phys. Rev. Lett. 121, 043602 (2018) (5 pages).
Vernon, Z. et al.; "Spontaneous four-wave mixing in lossy microring resonators", Phys. Rev. A 91, 053802 (2015) (9 pages).
Wang, H. et al.; "Tunable photon blockade in a hybrid system consisting of an optomechanical device coupled to a two-level system", Phys. Rev. A 92, 033806 (2015) (11 pages).
Weedbrook, C. et al.; "Gaussian quantum information", Rev. Mod. Phys. 84, 621 (2012) (49 pages).
Xu, X.-W. et al.; "Phonon blockade in a nanomechanical resonator resonantly coupled to a qubit", Phys. Rev. A 94, 063853 (2016) (10 pages).
Ye, Z. et al.; "Low-loss high-Q silicon-rich silicon nitride microresonators for Kerr nonlinear optics", Opt. Lett. 44, 3326 (2019) (4 pages).
Zhou, Y. H. et al.; "Unconventional photon blockade with second-order nonlinearity", Phys. Rev. A 92, 023838 (2015) (6 pages).

* cited by examiner

CONTROLLED PHOTON FOCK STATE GENERATION USING ARBITRARILY WEAK PHOTONIC NONLINEARITIES

CROSS REFERENCE

This application is based on and claims priority to U.S. Provisional Application No. 63/312,461, filed on Feb. 22, 2022, the entirety of which is herein incorporated by reference.

GOVERNMENT FUNDING

This invention was made with government support under grant number 1420709 awarded by the National Science Foundation, FA9550-19-1-0399 awarded by the U.S. Air Force Office of Scientific Research, and W911NF-19-1-0380 awarded by the U.S. Army Research Office. The government has certain rights in the invention.

FIELD OF THE INVENTION

This disclosure generally relates to a method and system for generating photonic Fock states, and particularly for generating single photons with arbitrarily weak photonic nonlinearities.

BACKGROUND OF THE INVENTION

Single-photon Fock states are critical resource in a myriad of quantum information protocols and technologies. Generation of single-photon Fock states often relies on having a large single photon nonlinearity in optical cavity. In some applications, it may be desirable to generate single photon Fock states even when the single photon nonlinearity is weak in comparison to, for example, single photon loss rate of the optical cavity.

BRIEF DESCRIPTION OF THE DRAWINGS

For a more complete understanding of the invention, reference is made to the following description and accompanying drawings, in which.

DETAILED DESCRIPTION

Introduction

By way of introduction, single-photon Fock states may constitute critical ingredients in a myriad of applications including but not limited to those relying on quantum information protocols and technologies. Generation of single-photon Fock states, for example, may rely on various types of photonic nonlinear interactions via other states in particular systems. In some implementations, single-photon Fock states may be generated in a cavity mode in a photonic cavity relying on a nonlinear interaction between photons in the cavity modes via other states present within the photonic cavity. The generation of single-photon Fock states essentially may be based on one of various types of single-photon blockade effect resulting from the nonlinear photonic interactions. Essentially, as a result of such blockade effect, the presence of a single photon prevents the generation of a photonic quantum state having multiphoton components. More broadly, as a result of a blockade effect, the presence of a particular photonic Fock state prevents generation of a photonic state with higher photon numbers.

Figure 1:
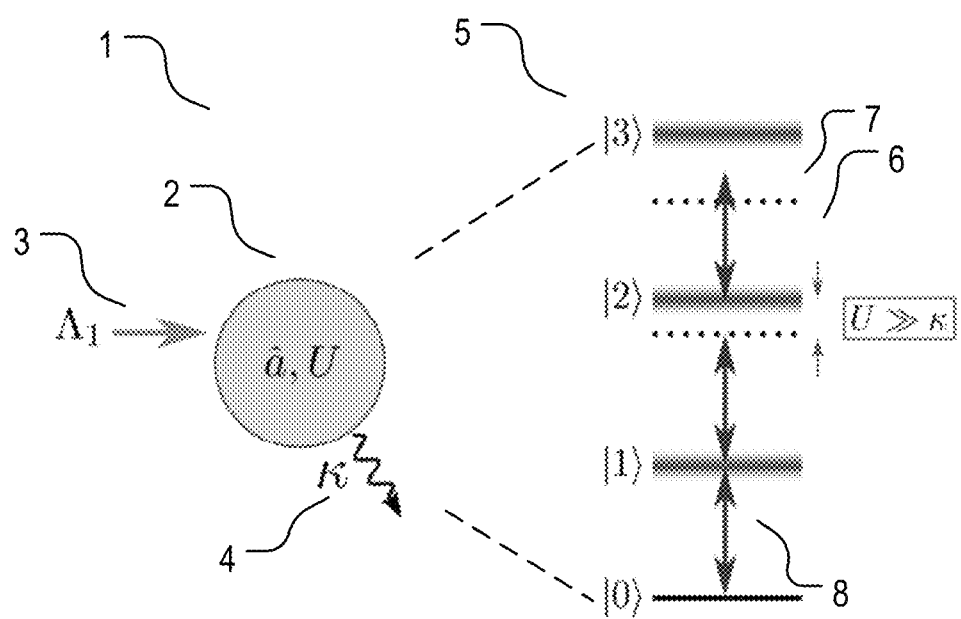
FIG. 1 illustrates an example photonic cavity system for generating single-photon Fock states based on a strong photonic nonlinearity that creates a single-photon blockade.

An example of a nonlinear photonic cavity system for generating single-photon Fock states is shown in FIG. 1. The system 1 may include a photonic cavity 2 driven by electromagnetic driving fields 3. The photonic cavity 2 may be characterized by a particular cavity mode with a resonance frequency along with a photonic nonlinear interaction U and cavity loss rate of κ (shown as 4 in FIG. 1). The cavity vacuum state is shown as $|0\rangle$ in the cavity energy level diagram 5 for this particular cavity mode. The photon number states or Fock states are shown as $|1\rangle$, $|2\rangle$, and $|3\rangle$ for single-photon, two-photon, and three-photon states, respectively. Due the photonic nonlinear interaction in this system, the resonant frequency between the single-photon state $|1\rangle$ and the two-photon state $|2\rangle$ may be shifted from that between the vacuum state $|0\rangle$ and the single-photon state $|1\rangle$, as shown by 6 of FIG. 1. Such shift is determined by the magnitude of the two-photon nonlinear interaction which depends on the photonic nonlinearity U. Likewise, the resonant frequency between the two-photon state $|2\rangle$ and the three-photon state $|3\rangle$ may be also shifted from those between the vacuum state $|0\rangle$ and the single-photon state $|1\rangle$ and between the single-photon state $|1\rangle$ and the two-photon state $|2\rangle$, as shown by 7 in FIG. 1.

As a result of the energy level shifts due to the photonic nonlinearity, the electromagnetic driving fields 3 having a drive frequency resonant between the vacuum state $|0\rangle$ and the single-photon state $|1\rangle$ for exciting the single-photon state $|1\rangle$ would be significantly off resonance with the transition from the single-photon state $|1\rangle$ to the two-photon state $|2\rangle$ and off resonance with the transition from the two-photon state $|2\rangle$ to the three-photon state $|3\rangle$ as shown by the arrows 8, under the condition that the photonic nonlinearity U is much larger than the cavity loss rate, i.e., U>>κ, such that the broadening of the energy-shifted two-photon state $|2\rangle$ and three-photon state $|3\rangle$, as characterized by the photonic cavity loss rate κ, is significantly smaller than the energy level shifts characterized by U. Under such a condition, excitation of multi-photon states including the two-photon state |2⟩, the three-photon state |3⟩ and other higher number photon states would be avoided and single-photon Fock state may be generated. This particular photon-blockade effect is essentially based on introducing sufficiently large nonlinearities in a spectrum of the system that causes energy shift of photon Fock states in the presence of other photonic states. Such type of photon blockade mechanism thus requires that the single-photon nonlinearities to be much larger than the loss rate and may be achieved in highly nonlinear optical cavities incorporating single atoms, quantum dots, superconducting resonators, or the like. This type of photon blockade may be out of reach in more conventional systems that exhibit only weak nonlinearities (e.g. optical micro or nanoresonators fabricated using materials with intrinsic $x^{(3)}$ nonlinearities).

In some implementations of this disclosure, an alternative photon blockade effect may be achieved by using photonic nonlinearities to modify matrix elements of an effective cavity driving process as opposed to introducing nonlinearities into an optical response spectrum (such as the mechanism of FIG. 1). Because this alternative type of photon blockade does not rely on spectral nonlinearities, it may be used to deterministically generates truly non-Gaussian blockaded states (i.e., zero probability for more than one photon, or single-Fock state probability to be the order of 1) using arbitrarily weak single-photon nonlinearities in comparison to the cavity photon loss rate. This type of photon blockade mechanism may be based on using nonlinearity to modify matrix elements of an effective cavity driving process and to realize an effective single-mode Hamiltonian of the form:

$$\hat{H}_{block} = \tilde{\Lambda}_3 \hat{a}\dagger(\hat{a}\dagger\hat{a}-r) + h.c. \quad (1)$$

where the parameter r is tuned to 1 for single photon. Here a is the cavity annihilation operator, $\tilde{\Lambda}_3$ is the amplitude of an effective nonlinear driving process.

Figure 2:
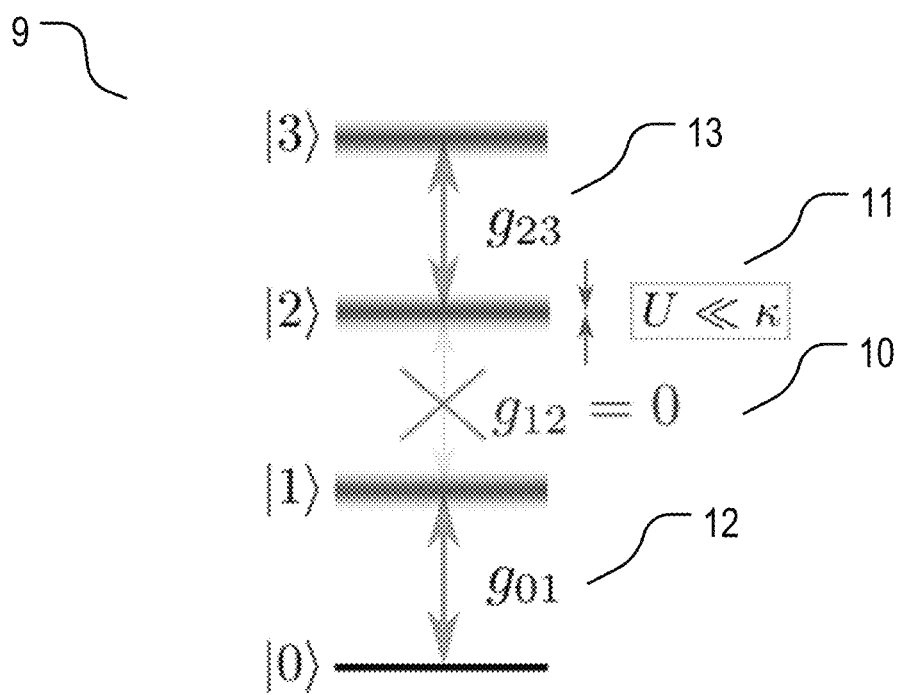
FIG. 2 illustrates an example photonic cavity system for generating single-photon Fock states based on arbitrarily weak photonic nonlinearity using a nonlinear drive that has no matrix element $g_{12}$ connecting states $|1\rangle$ and $|2\rangle$.

By construction and as illustrated in the energy level diagram 9 in FIG. 2, this Hamiltonian connects the vacuum state |0⟩ and one photon state |1⟩, but does not allow driving from |1⟩ to the |2⟩ photon state, as shown by the zero matrix element 10. Crucially, as this blockade is a matrix element effect, it is effective even if cavity loss is much larger than the nonlinearity U, because this mechanism does not require large energy or spectral shift of the two-photon state |1⟩, as shown by 11. As such, only single photon state is accessible as a result of the nonzero matrix element between the vacuum state |0⟩ and the single-photon state |1⟩ (shown by 12). The two photon state |2⟩ cannot be accessed due the zero matrix element 10. Higher number photon states such as the three-photon state |3⟩ cannot be accessed even though the matrix element between the state |2⟩ and |3⟩ may be non-zero (as shown by |3⟩) because the lack of excitation of the two-photon state 12).

While the basic mechanism in the Hamiltonian construction of Equation (1) appears straightforward, it describes an unusual nonlinear driving element. Despite its exotic form, the disclosure below shows that it can be achieved using standard ingredients including but not limited to a standard Kerr-type nonlinearity (strength U), along with standard single-photon (alternatively referred to as one-photon) and two-photon (i.e. parametric) drives. Such single-photon blockade mechanism may be effective even if the Kerr nonlinearity strength U is much weaker than the cavity loss rate κ. In addition, as described in further detail below, this scheme can also be realized using three-wave mixing type (i.e. $x^{(2)}$) nonlinearities rather than standard Kerr-type nonlinearities. This underlying mechanism may also be extended and used to generate more complex blockaded states including but not limited to multi-mode non-Gaussian entangled states.

The mechanism disclosed herein exhibits metastability and two distinct slow relaxation timescales. The intermediate-time dynamics can be very different from the ultimate steady state. In particular, this shorter time regime enables the near-perfect generation of Fock states (including states with highly negative Wigner functions), in a way that is robust against imperfections. The mechanism functions under a generic driven Kerr cavity system. Unlike currently explored other photon-blockade schemes, such as the so called "unconventional photon blockade" (UPB), where states with arbitrarily small $g^{(2)}(0)$ correlation functions can be generated using extremely weak nonlinearities, the scheme disclosed herein generated near perfect photon Fock states rather than Gaussian states that have positive-definite Wigner functions, that do not exhibit a true cut-off in their photon number distribution, and that only exhibit suppressed intensity fluctuations in the limit where the average photon number is vanishingly small.

In some implementations, this basic mechanism may be harnessed using a time-dependent protocol that generates propagating Fock states in a variety of realistic weakly-nonlinear optical systems in the lab frame. For example, truly photon-blockaded states using a cavity mode with an extremely weak Kerr nonlinearity U<<κ and standard one- and two-photon drives may be generated in a displaced frame. In the displaced frame, and for ideal matching of drive amplitudes, these states may have zero population of states with two or more photons, and moreover, can have a population of the |1⟩ Fock state that approaches one. The example time-dependent protocol thus involves transforming the system into a displaced frame, generating the Fock state in the displaced frame, and then transforming the system back into the lab frame. It can also be shown that this process is robust again modest errors in matching the two drive amplitudes appropriately.

Figure 3:
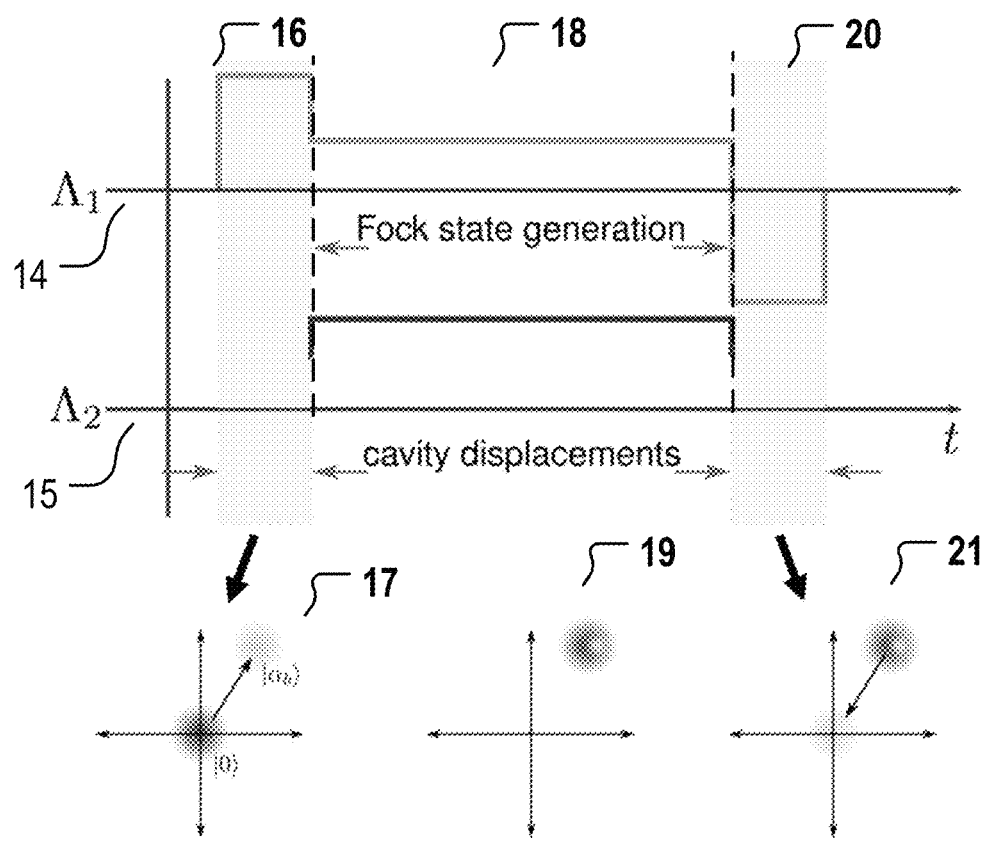
FIG. 3 illustrates an example three-step drive protocol for generating single-photon Fock state in a cavity mode with arbitrarily small nonlinearity in comparison to the cavity mode photon loss rate.

The basic example protocol is sketched in FIG. 3. A single-photon drive with amplitude $\Lambda_1$ having a time profile shown as 14 and a two-photon drive with amplitude $\Lambda_2$ having a time profile shown as 15 in FIG. 3 are used to drive a cavity system having a resonant cavity mode and a weak nonlinearity (e.g., Kerr nonlinearity). The single-photon and two-photon drives may be applied with the time profiles in three example stages or steps:

1. Initial displacement: As shown by 16, with the cavity initially in vacuum state |0⟩ of the resonance cavity mode, the resonant mode of the cavity may be rapidly transformed into a displaced frame using a short and high amplitude single-photon drive $\Lambda_1$ to a coherent state $|\alpha_b\rangle$ (a coherent superposition state of photon number states, see Equation (8) below for a displacement parameter) of the resonant mode, as illustrated by 17. The initial single-photon drive essentially achieves an active transformation to displace the resonant mode of the cavity by an amplitude of $\alpha_b$ for achieving a displaced Hamiltonian such as the Hamiltonian shown in Equation (6) below. Specifically, the displacement transformation $\hat{a} \to \hat{a} + \alpha_b$ may be implemented and led to a Hamiltonian transformed to a displaced Hamiltonian as described in further detail below.

2. Fock state generation: Both the single-photon drive $\Lambda_1$ and the two-photon drive $\Lambda_2$ are turned on, with their amplitudes set to predetermined values (such as those given by Equations (9a) and (9b) below for a generation of the single-photon Fock state, as shown by 18. Specifically, the resonant mode of the cavity system is allowed to evolve under the single-photon drive and the two-photon drive for an optimally-chosen time $T_{block} \sim |\tilde{\Lambda}_3|^{-1}$. This will lead to a preparation of a good approximation of the single-photon blockaded state in the displaced frame, as shown in 19.

3. Final displacement: Finally, the two-photon drive is turned off, and the amplitude of the single-photon drive $\Lambda_1$ is adjusted so as to rapidly displace the resonant mode of the cavity by an amount $-\alpha_b$ into the lab frame, as shown in 20. This then shifts the resonant mode of the cavity system from the displaced-frame blockaded state to lab-frame blockaded state (ideally the state |1⟩), as shown by 21.

The end result of the example three-step protocol above is a blockaded, approximate single-photon state in resonant mode of the cavity. To turn this into a propagating single photon state, the cavity may be configured to couple to a waveguide structure or transmission line. With such coupling, the intracavity single-photon blockaded state in the resonant mode may then preferentially leak out into the waveguide structure of the transmission line after some time as an approximate Fock state in a propagating mode with an exponential profile. While such coupling may increase cavity loss rate κ, that would not be overly detrimental to the example protocol because this protocol can be effective even if the cavity nonlinearity U is much smaller than the total loss rate κ of the cavity mode.

Figure 4:
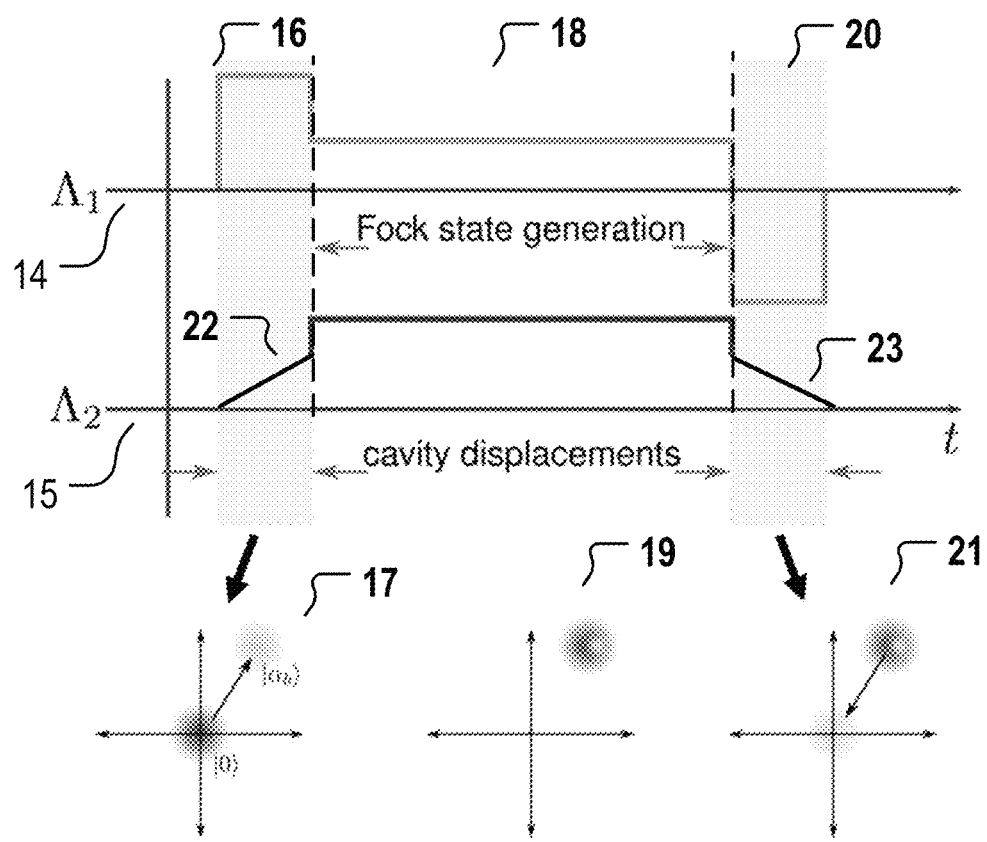
FIG. 4 illustrates an example three-step drive protocol for generating single-photon Fock state taking into consideration a compensation of a parametric error from one drive by adjusting another drive.

The initial and final displacements in the example protocol above are critical for achieving the final lab-frame photon-blockaded state. As described in further detail below, these example displacements should correspond to amplitudes $\alpha_b$, $-\alpha_b$ respectively, where the single-photon drive amplitudes are determined by Eq. (8). A failure to perform this ideally represents another possible imperfection that would degrade the scheme above. Even if the one-photon drive used to perform these displacements can be calibrated perfectly, the weak cavity nonlinearity U can cause errors during steps 1 and 3 of the protocol. The dominant error may include an unwanted parametric drive generated via U. In some implementations, such an error could be canceled by also applying compensating two photon drive $\Lambda_2 \neq 0$ during steps 1 and 3; this is depicted in 22 and 23 of FIG. 4. More details with respect to such errors and their compensation using the two-photon drive are provided in later sections of this disclosure.

The one-photon and two-photon drives described above should be detuned from the resonance cavity frequency in a commensurate manner. Specifically, if the one photon drive is detuned from the one-photon resonance frequency an offset amount δ, then the two-photon drive may be detuned from the two photon resonance frequency an amount of 2δ.

The two photon drive above may be implemented using a multi-color or multi-tone (e.g., two-color or two-tone) scheme. For example, the two-photon drive may be achieved by using multiple (e.g., two) linear drives in combination. The sum of the frequencies of the multiple linear drives (e.g., two linear drives) may match the frequency needed for a target two-photon drive described above. The multiple linear drives thus combine to achieve the effect of a target two-photon drive. The frequency of each of the multiple linear drives may be selected such that they do not cause appreciable driving of the single photon resonance.

While the various implementations described here are designed to be capable of generating Fock states even when the nonlinearity in the cavity relevant to the resonance mode is weaker than the cavity loss rate, these implementations equally apply to situations where the cavity nonlinearity is relatively strong (e.g., larger than the cavity loss rate).

Figure 5:
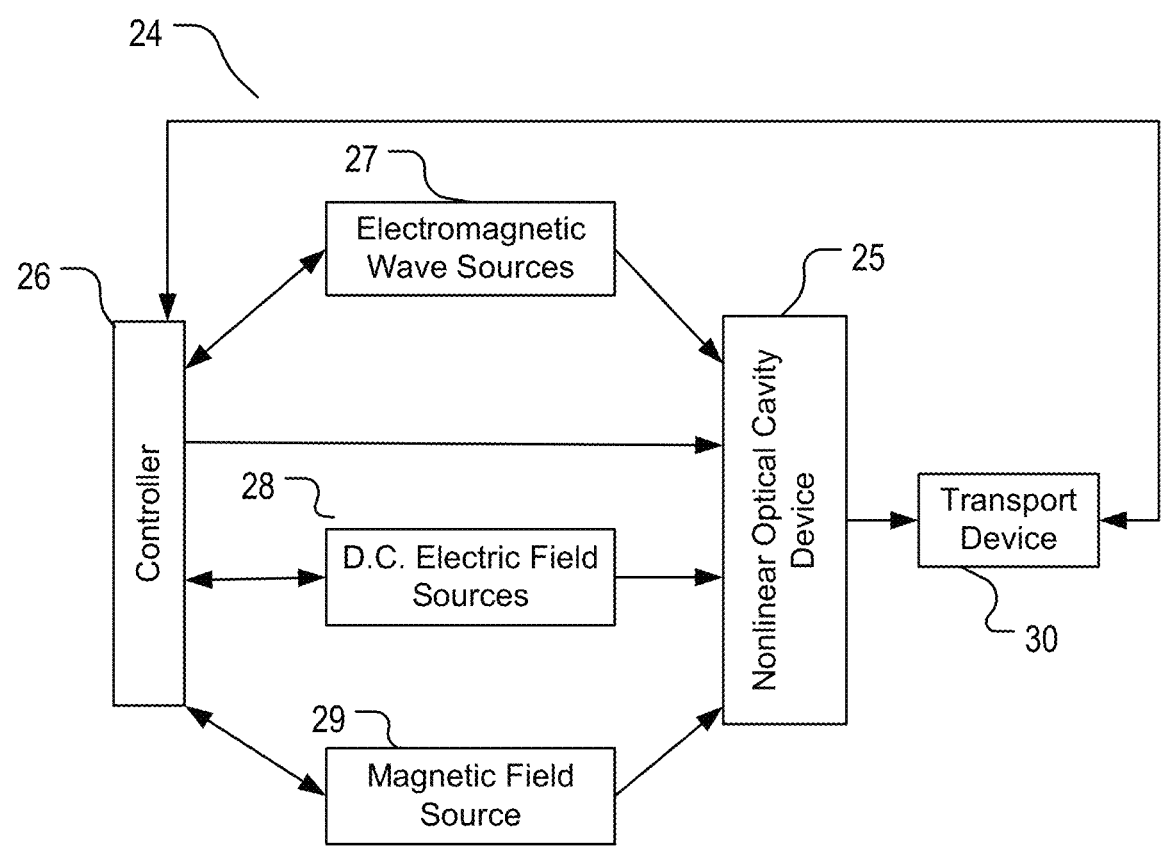
FIG. 5 illustrates an example system for generating single-photon Fock states based on a strong photonic nonlinearity that creates a single-photon blockade.

FIG. 5 shows an example system 24 for generating a single-photon Fock state in an electromagnetic mode in a nonlinear cavity and transporting the generated single-photon Fock state. The system 24 includes a electromagnetic resonator or cavity 25, a controller 26, one or more electromagnetic wave sources (laser sources in particular) 27, one or more D.C. electric field sources 28, one or more magnetic field sources 29, and transport device 30. In some implementations, the system 24 may include at least the nonlinear cavity 25 and the electromagnetic wave sources 27, and may further optionally include one or more of the other components above.

In FIG. 5, the controller 26 may be of any form of dedicated circuits, general-purpose instruments, and mobile or fixed electronic devices including but not limited to desktop computer, laptop computers, tablets, mobile phones, personal digital assistants, and the like. The controller 26 may be configured to provide a user interface for controlling the single-photon Fock state generation in the nonlinear cavity 25 and the subsequent transport of the generated single-photon Fock state. The controller 26 may include communication interfaces, processors, input/output (I/O) interfaces, storages, and display circuitry. The controller 26 may communicate with one or more of the other components of the system 24 to trigger operations and to send/receive commands, data, or the like, as shown by the various arrows in FIG. 5 connecting the controller 26 to other components of the system 24.

The electromagnetic wave sources 27 of FIG. 5 may be of any type of sources for generating electromagnetic radiation in various suitable and controllable spectral ranges. The electromagnetic wave sources 27 may include lasers that can be configured to emit coherent optical radiation at controlled wavelength with controlled timing. While the disclosure herein focus on optical cavity system with resonances in the optical spectral range, the underlying principle applies to other spectral range. For example, the nonlinear cavity 25 of FIG. 5 may be implemented as a nonlinear microwave resonator (such as a planer or three-dimensional superconducting resonator) and the implementations described herein would provide a scheme for generating single-photon blockaded state in the microwave spectral range. The electromagnetic wave sources 27 would correspondingly include, for example, one or more signal generators, electromagnetic transducers/amplifiers, inductive/capacitive devices, and the like for the generation of coherent microwave radiation at controlled frequency and controlled timing. The output electromagnetic fields (alternatively referred to as electromagnetic drives) may be directed to the nonlinear cavity 25, via free space, transmission lines, microwave guides, optical fibers, or any other suitable means. The output electromagnetic fields may be further manipulated (e.g., focused, collimated, and the like using optical/microwave components) before being directed to the nonlinear cavity 25. For controlling the timing, for example, the electromagnetic field may be turned on and off abruptly or ramped up and down smoothly or adiabatically.

The system 24 may optionally include the D.C. electric or magnetic sources 28 and/or 29. The D.C. sources 28 and/or 29 may be used to generate and apply D.C. electric and/or magnetic fields to the cavity 25 to modify characteristics of the the cavity to effectuate a control of the resonance mode (e.g., to modify the index of fraction or other optical properties of the cavity medium).

The nonlinear cavity 25 of FIG. 5 may include one or more resonators with nonlinearity. The resonators, for example, and in the context that this disclosure focuses on, may be implemented in the form of an optical resonator such as optical Fabre Pérot resonators, ring resonator, and the like (even though resonators in other spectral range can be likewise implemented, such as microwave resonators).

The transport device 30 of FIG. 5 may be configured to out-couple and transport a single-photon Fock state generated in the nonlinear cavity 25. In the optical spectral range, the transport device 30 may be implemented as an optical waveguide structure or an optical fiber coupled to the nonlinear cavity 25. As described above, with such coupling, the intracavity single-photon blockaded state generated within the cavity 25 may then preferentially leak out into the transport device 30 after some time as the Fock state in a propagating mode with an exponential profile. While such coupling may increase cavity loss rate κ, that would not be overly detrimental because the single-photon blockaded state generation scheme disclosed herein can be effective even if the cavity nonlinearity U is much smaller than the total loss rate κ of the cavity mode. 25.

Figure 6:
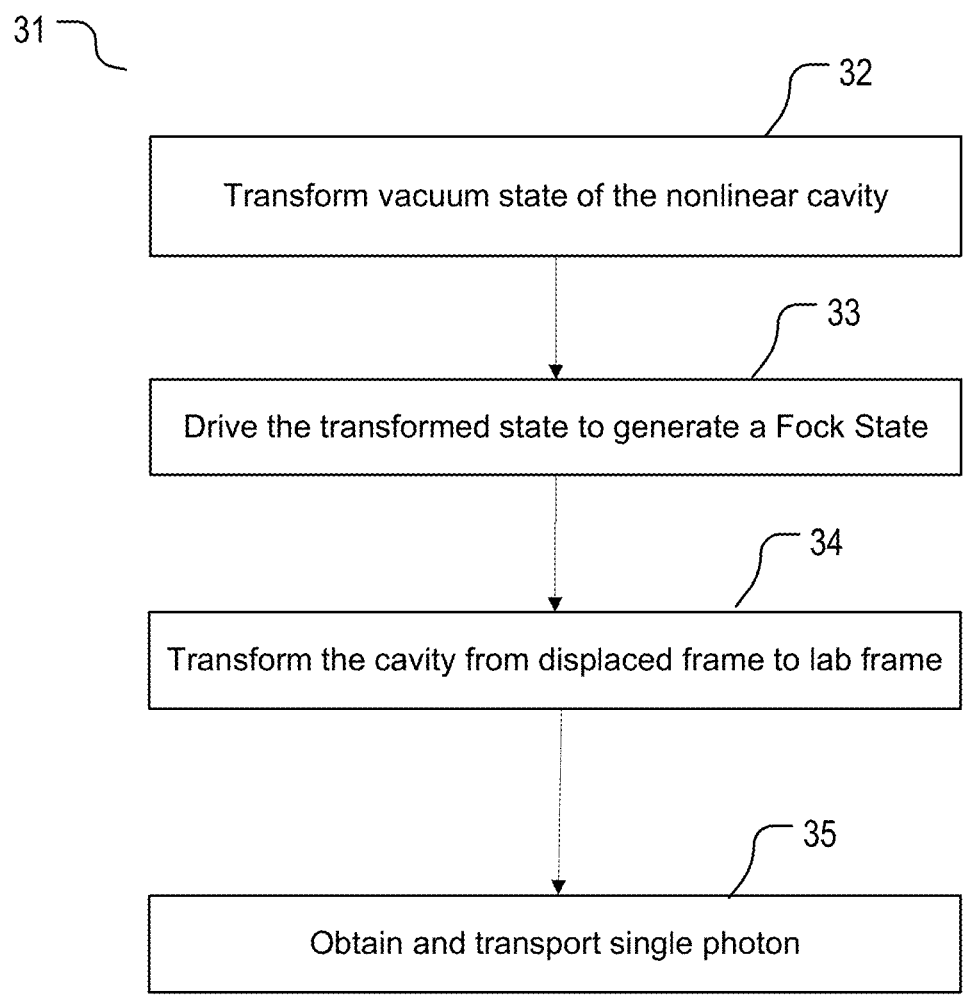
FIG. 6 shows a logic flow of an example method for generating and transporting Fock states in a cavity system.

FIG. 6 further shows a logic flow 31 of an example method corresponding to the scheme above for generating Fock states in the cavity system. In Step 32, a nonlinear cavity is provided and is transformed from its vacuum state to, for example, a coherent state under, for example, a single-photon drive. The cavity system is thus transformed in a displaced frame. As described above, an example two-photon drive may be additionally applied to assist with compensating for unwanted parametric drive generation via the cavity nonlinearity. In Step 33, the cavity system is driven to generate a Fock state in the displaced frame. For example, a single photon drive and a two-photon drive may be controllably applied to generate a single-photon Fock state. In Step 34, a back-transform drive may be applied to transform the cavity system from the displaced frame to the lab frame. For example, a one-photon drive may be applied for the transformation. Again, a two-photon drive may be additionally applied to assist with compensating for unwanted parametric drive generation via the cavity nonlinearity. In Step 35, once the cavity system is transformed into the lab frame, the Fock state generated in previous steps may then be obtained in the lab frame and then may be transported via, for example, optical waveguide or other structures coupled to the cavity system. Such coupling, again, may affect the cavity loss rate, but would minimally impact the generation of the Fock state even when the cavity nonlinearity is much smaller than the cavity loss rate that includes the loss to the waveguide or other structures for transporting the Fock state.

Basic Mechanism and Hamiltonian Engineering in a Driven, Weakly-Nonlinear Cavity The example target Hamiltonian shown in Equation (1) appears to include somewhat exotic nonlinear drives. This section provides detailed discussion of example approaches for achieving such nonlinear drive for generation of single-photon Fock state that may be implemented in the three-step protocol described above and in the system shown in FIG. 5.

For example, the nonlinear cavity may include a single mode of a bosonic resonator (with resonant frequency $\omega_c$, a lowering operator $\hat{a}$) having a weak self-Kerr nonlinearity U, which is subject to both one- and two-photon drives with amplitudes $\Lambda_1$ and $\Lambda_2$ respectively and drive frequencies $\omega_1$ and $\omega_2$ respectively. The starting lab-frame Hamiltonian is thus ($\hbar=1$):

$$\hat{H}=\omega_c \hat{a}^\dagger \hat{a}+U(\hat{a}+\hat{a}^\dagger)^4+(\theta_1 e^{-i\omega_1 t}+\theta_1^* e^{i\omega_1 t})(\hat{a}+\hat{a}^\dagger)+ (\theta_2 e^{-i\omega_2 t}+\theta_2^* e^{i\omega_2 t})(\hat{a}\hat{a}+\hat{a}^\dagger \hat{a}^\dagger). \quad (2)$$

It is assumed that the only nonlinearity in this lab-frame Hamiltonian is Kerr interaction U, which is allowed to be extremely weak, e.g., U<<κ. The two-photon drive, for example, may be a standard parametric drive and can be realized without requiring a strong single-photon nonlinearity. For example, a standard approach would be to use a weak nonlinear coupling to an auxiliary pump mode that is strongly driven, or just simply apply two additional (linear) drive tones to the main cavity mode. The approach taken herein may be agnostic to the specific mechanism used to realize $\Lambda_2$.

In some implementations, the one-photon and two-photon drive frequencies $\omega_1$ and $\omega_2$ may be chose to satisfy $2\omega_1=\omega_2=2(\omega_c-\Delta)$ (detuned from the resonance frequency $\omega_c$ by $\Delta$). It is also assumed that $\omega_c$ is the largest frequency in the system, allowing for a rotating wave approximation (RWA) on both the nonlinearity and the drive terms. Starting from the lab-frame Hamiltonian above, moving to the rotating frame set by $\omega_1$, and making a standard RWA, the lab-frame Hamiltonian in the rotating frame would be:

$$\hat{H}_{RWA}=U\hat{a}^\dagger \hat{a}^\dagger \hat{a}\hat{a}+\Delta \hat{a}^\dagger \hat{a}+(\Lambda_1 \hat{a}+\Lambda_2 \hat{a}\hat{a}+h.c.). \quad (3)$$

The single photon loss at the rate κ may be included using a standard Lindblad master equation description. The reduced density matrix of the cavity mode may be designated by $\hat{\rho}$, and it may follow:

$$\frac{d}{dt}\hat{\rho} = -i[\hat{H}_{RWA}, \hat{\rho}] + \kappa \mathcal{D}[\hat{a}]\hat{\rho}. \quad (4)$$

where $\mathcal{D}[\hat{a}]\hat{O}=(\hat{a}\hat{O}\hat{a}^\dagger-\{\hat{a}^\dagger \hat{a}, \hat{O}\}/2)$ represents the standard Lindblad dissipative superoperator.

From a quantum optics perspective, the driven cavity mode has an extremely weak Kerr nonlinearity, and are driven by simple quadratic driving terms (which on their own would only generate simple Gaussian states). In some implementations, a general approach may be taken to use linear driving (i.e., a displacement in phase space) to effectively enhance the effects of nonlinearity U. Such linear displacements may be used in other situations to enhance the properties of weakly nonlinear systems by yielding tunable linear dynamics (e.g. in parametric amplifiers realized by driving weakly nonlinear cavities, or tunable sideband interactions in quantum optomechanics). Such linear dynamics does not allow for the generation of non-classical, non-Gaussian states. Here, however, a displacement may be used to generate an effective nonlinear cavity drive with a strength>>U. The interaction realized here represents a single-photon cavity drive whose magnitude is controlled by the photon number of the cavity itself, as opposed to that of a highly nonlinear auxiliary system utilized in implementations in other circumstances. The disclosure below shows that with appropriate parameter tuning, a simple displacement of the weakly nonlinear Hamiltonian in Equation (3) may yield the kind of nonlinear driving interaction that are particularly suitable for the generation of single-photon Fock state in the displaced frame. Specifically, by moving to a displaced frame of the cavity, $\hat{a} \to \hat{a}\alpha$ where $\alpha$ is an arbitrary displacement parameter, a displacement-enhanced nonlinearity may be generated. Upon moving to a displaced frame of the cavity, the Kerr nonlinearity may generate, among corrections to the other terms in HRWA, the desired nonlinear drive $\tilde{\Lambda}_3 \hat{a}^\dagger \hat{a}^\dagger \hat{a}$+h.c. with drive amplitude: $\tilde{\Lambda}_3 = 2U\alpha$ (see Equation (8)).

A target blockade Hamiltonian in the displaced frame, for example may be:

$$H_{target} = (\tilde{\Lambda}_3 \hat{a}^\dagger (\hat{a}^\dagger \hat{a} - r) + h.c.) + U \hat{a}^\dagger \hat{a}^\dagger \hat{a} \hat{a}. \tag{5}$$

where parameter r may be set to positive integer. This Hamiltonian describes a nonlinear driving process that may pump up an initial vacuum state to the n=r Fock state, but no higher. For r=1, the driving process can only pump up to a single-photon Fock state.

To achieve this, a displacement transformation to a new frame where the original photonic vacuum is shifted to a coherent state $|-\alpha\rangle$. The corresponding unitary is $\mathcal{D}_\alpha = \exp(a\hat{a}^\dagger - \alpha^* \hat{a})$, which may transform the lowering operator $\hat{a} \to \hat{a} + \alpha$. In this new displacement frame, the master equation for the cavity system has the same form as Equation (4), but with a modified displaced Hamiltonian $\hat{H}_\alpha$.

$$\hat{H}_\alpha = U\hat{a}^\dagger \hat{a}^\dagger \hat{a}\hat{a} + \tilde{\Lambda}\hat{a}^\dagger \hat{a} + (\tilde{\Lambda}_1 \hat{a}^\dagger + \tilde{\Lambda}_2 \hat{a}^\dagger \hat{a}^\dagger + \tilde{\Lambda}_3 \hat{a}^\dagger \hat{n} h.c.) \tag{6}$$

All of the terms in the original lab-frame Hamiltonian appear in $\hat{H}_\alpha$, but with altered coefficients. The displaced-frame Hamiltonian parameters may be:

$$\tilde{\Delta} = \Delta 4U = \alpha =^2, \tag{7a}$$

$$\tilde{\Lambda}_1 = \Lambda_1 + \alpha\Delta + 2\alpha^*\Lambda_2 + 2U|\alpha|^2\alpha - 1/2i\kappa\alpha, \tag{7b}$$

$$\tilde{\Lambda}_2 = \Lambda_2 U\alpha^2, \tag{7c}$$

$$\tilde{\Lambda}_3 = 2U\alpha. \tag{7d}$$

A desired strength for the nonlinear drive amplitude $\tilde{\Lambda}_3$ in $\hat{H}_\alpha$, may be determined first. Then the displacement parameter a may be picked to achieve this nonlinear drive amplitude. For example, the displacement parameter $\alpha$ may be picked via Equation (7d) as:

$$\alpha \to \alpha_b \equiv \frac{\tilde{\Lambda}_3}{2U}. \tag{8}$$

In some implementations, it may be designed that the drive amplitude $\tilde{\Lambda}_3 \gtrsim \kappa$. As such, a large displacement may be desirable if the nonlinearity U is weak according to Equation (8). Further, in some implementations, the original drive parameters $\tilde{\Lambda}_1$, $\tilde{\Lambda}_2$, and $\Delta$ may be selected to make the remaining terms in the full displaced Hamiltonian $\hat{H}_\alpha$ in Equation (6) match $\hat{H}_{target}$. This leads to the choices:

$$\Lambda_1 \to \Lambda_{1,b} \equiv \tilde{\Lambda}_3 \left[ -r + \frac{|\tilde{\Lambda}_3|^2}{2U^2} + \frac{i\kappa}{4U} \right], \tag{9a}$$

$$\Lambda_2 \to \Lambda_{2,b} \equiv -\tilde{\Lambda}_3^2/4U, \tag{9b}$$

$$\Delta \to \Delta_b \equiv -|\tilde{\Lambda}_3|^2/U. \tag{9c}$$

With this example choice of drive parameters and displacement parameter $\alpha$, the displaced-frame Hamiltonian $\hat{H}_\alpha$, would have the desired form of the target blockade-producing Hamiltonian in Equation (5). If r in Equation (9a) is picked to be an integer, it follows that blockaded dynamics in the displaced frame may be achieved. For example, the parameters can be chosen to achieve r=1 and if the system starts in the vacuum state in the displaced frame (i.e. a coherent state in the lab frame), then the full system dynamics may be confined to the Fock states n=0, n=1 in the displaced frame, regardless of how small the original value of U is.

The disclosure above thus shows how the basic principle of Equation (1) can be realized using an arbitrarily-weak Kerr nonlinearity and standard one- and two-photon driving processes. The magnitude of the nonlinear driving in the displaced frame may be the product of the original Kerr nonlinearity U (which could be extremely small) and the displacement a (which at this stage, may be assumed to be large). The process described so far only yields blockaded states and Fock states in the displaced frame. As described in the three-step protocol above, similar principle may be harnessed to generate true lab-frame Fock states by a displacement drive to transform the system from the displaced frame back to the lab frame.

Blockade Dynamics in the Presence of Loss

The dynamics of the driven cavity system in the displaced frame is described below. Such dynamics may be described by the displaced-frame master equation $$\frac{d}{dt}\hat{\rho} = -i[\hat{H}_{target}, \hat{\rho}] + \kappa \mathcal{D}[\hat{a}]\hat{\rho} \tag{10}$$

where $\hat{H}_{target}$ is given by Equation (5). The example dynamics is given below by taking the parameter r as close to, but not identical, to its ideal value for an n=1 Fock state blockade, i.e. r=1+δr. In practice, δr corresponds to a failure to exactly match the one and two photon drive amplitudes in the ideal required manner, as dictated by Equations (9a) and (9b). This formulaic approach may facilitate an understanding of the temporal dynamics on time scales t≲1/κ, and identifying optimal parameters for generating Fock states.

Dynamics for Ideal Drive Amplitude Matching

A perfect parameter tuning of δr=0 indicates ideal blockade dynamics where the drive cannot connect the n=1 and n=2 Fock states in the displaced frame. Within the blockade manifold spanned by $\{|0\rangle, |1\rangle\}$, the cavity behaves like a two-level-system which is resonantly driven with Rabi frequency $\propto \tilde{\Lambda}_3$, i.e. $\hat{H}_{target} \to \tilde{\Lambda}_3 |1\rangle \langle 0| + h.c.$ As there is no probability of having two or more photons, for this perfect tuning of r, the equal-time $g^{(2)}$ correlation function (defined as $g^{(2)}(0) \equiv \langle \hat{a}^\dagger \hat{a}^\dagger \hat{a}\hat{a} \rangle / \langle \hat{a}^\dagger \hat{a} \rangle^2$) is always exactly 0. To generate a single-photon state, for example, an effective π-pulse may be performed. This may be implemented by turning on the one and two photon drives (with amplitudes given by Equations (9a) and (9b)) for a time $t_\pi = \pi/(2|\tilde{\Lambda}_3|)$. This allows a generation of a Fock state in the limit where $t_\pi \ll 1/\kappa$, or $|\tilde{\Lambda}_3|/\kappa \gg 1$. This condition can be met even if U≪κ.

Impact of Imperfect Drive-Amplitude Matching.

The dominant error mechanism for the scheme described above may be identified as an inability to perfectly match the drive amplitudes $\Lambda_1$ and $\Lambda_2$ as required to achieve r=1. For small mismatch δr, there may be only a weak matrix element connecting $|1\rangle$ to $|2\rangle$. This may mean that there may still be approximate blockade over a long timescale, enabling the production of non-classical blockaded states. The desired perfect single photon blockade may require matching of the linear and cubic driving terms in the displaced-frame Hamiltonian $\hat{H}_\alpha$ (in Equation (6)), i.e., $\tilde{\Lambda}_1 = -\tilde{\Lambda}_3$ (i.e. r=1). Deviations from this amplitude-matching condition may then degrade the Fock state generation scheme above. The dimensionless relative amplitude error in the single-photon drive amplitude, $\delta\lambda_1$, may be defined via $$\tilde{\Lambda}_1 = -\tilde{\Lambda}_3(1+\delta\lambda_1). \quad (11)$$

While in general both the magnitude and phase of $\delta\lambda_1$ are important, for the small deviations, only the magnitude may significantly matter. The parameter $\delta\lambda_1$ may be taken as real and positive for all of the numerical simulations below.

To get some analytic insight into the impact of this imperfection, the most interesting regime of small imperfection $|\delta\lambda_1| \ll 1$ and large effective driving, $|\tilde{\Lambda}_3| > \kappa$, may be considered. For short times, dissipation can be neglected, and further, the dynamics may be restricted to the states $|0\rangle$, $|1\rangle$, and $|2\rangle$ (as the leakage to higher levels is weak). In this regime, the instantaneous $g^{(2)}(0; t)$ may be time-independent and given by $$g^{(2)}(0;t) = |\delta\lambda_1|^2. \quad (12)$$

This suggests that highly blockaded states are possible without requiring an incredibly precise balancing of drive amplitudes.

Figure 7:
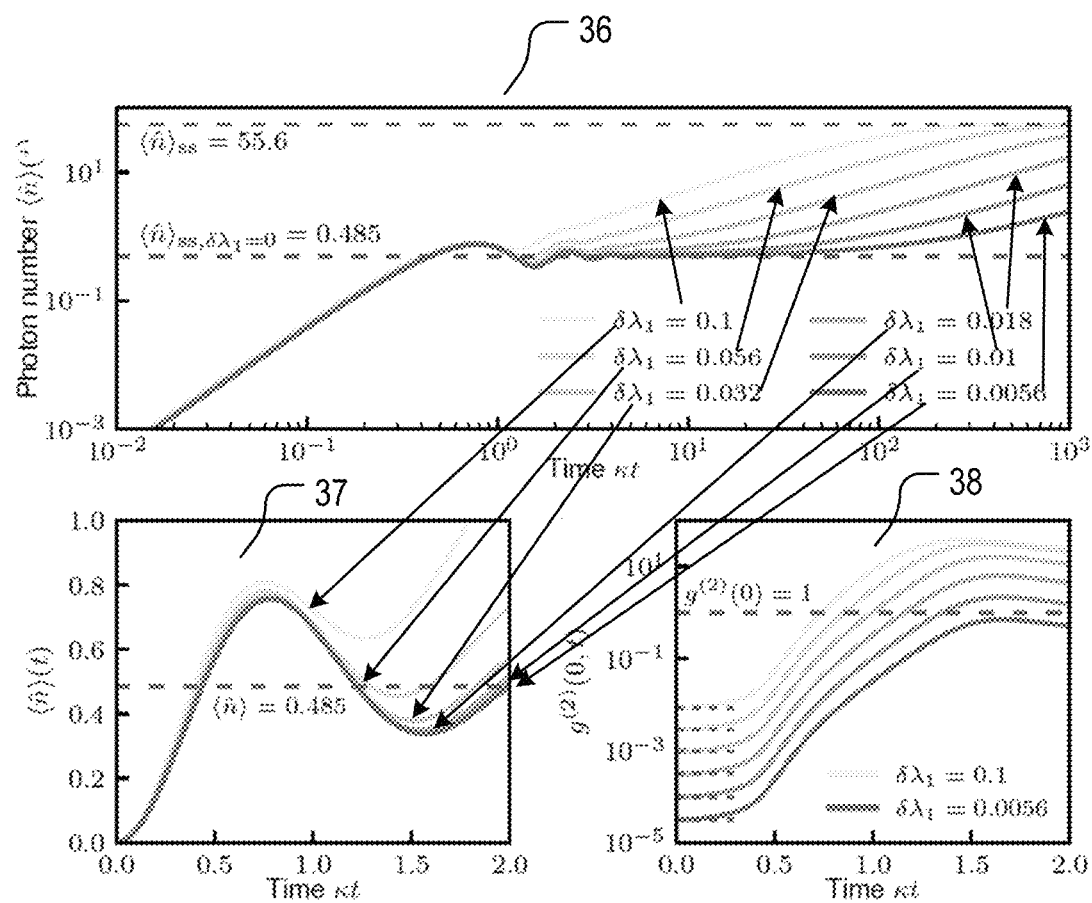
FIG. 7 illustrates impact of mismatched drive amplitudes on blockade dynamics.

FIG. 7 shows example numerical simulation of a non-zero drive amplitude mismatch $\delta\lambda_1$. In 36 of FIG. 7, an example average intracavity photon number versus time (in log scale) for values of a dimensionless relative amplitude mismatch $\delta\lambda_1$ (Equation (11)) is shown. It indicates that the intracavity average photon number undergoes Rabi oscillations before leaving the blockaded subspace. It further indicates two distinct timescales: the desired low-amplitude blockaded state is reached on a timescale of about $1/\kappa$; whereas if $\delta\lambda_1 \neq 0$, there is a much slower heating to a high amplitude state. The shorter time scale for the average photon number is further shown as a zoomed portion in 37 of FIG. 7 in linear rather than logarithm time axis. In 38 of FIG., an instantaneous intracavity correlation function $g^{(2)}(0; t)$ for various imperfection levels $\delta\lambda_1$ is shown. It shows that Equation (12) provides a good description of the intracavity $g^{(2)}(0)$ until a time $t \sim 1/|\tilde{\Lambda}_3|$, after which there is a departure from the blockaded subspace. The dashed lines in 36 and 37 of FIG. 7 represent the ideal $\delta\lambda_1=0$ steady-state average photon number, whereas the dashed line in 38 represents the short-timescale analysis result in Equation (12). For FIG. 7, example parameter values of $U=0.4\kappa$ and $\tilde{\Lambda}_3=2\kappa$ are used. The net result of the simulations in FIG. 7 and other analysis is that errors in amplitude matching do not prevent the generation of useful blockaded states: for short times, the evolution produces states with small $g^{(2)}(0)$ while at the same time having appreciable non-vacuum population. As FIG. 7 shows, even for relative mismatches of $\delta\lambda_1 \sim 0.1$, blockaded states with $\langle \hat{a}^\dagger \hat{a} \rangle \sim 0.5$ and $g^{(2)}(0) < 0.1$ can be produced.

Slow Time Scales, Metastability and Blockaded States in the Infinite-Time Limit

While for applications, the relatively robust blockade generation described above at short times is more than sufficient, the nature of the long-time steady state may further provide insight into the underlying dynamics. For $\delta\lambda_1=0$, the blockade may be perfect for all times, and the steady state may have no population of higher Fock states. With imperfections, the situation may be different. As shown above, the short-time blockade may be relatively robust against amplitude mismatch errors. This however may not true for the infinite-time state. As discussed in more detail below for infinite-time state, for $\delta\lambda_1=0$, the system may have a long-lived, metastable high-photon number state that is only able to decay via quantum tunneling.

This may manifest itself as an extremely slow relaxation rate (i.e., dissipative gap):

$$\gamma_{slow} \sim \kappa \exp\left(-\frac{9|\tilde{\Lambda}_3|^2}{4U^2}\right) \quad (13)$$

(see Equation (22) below). This exponentially small dissipative gap directly leads to the fragility of the steady-state photon blockade to mismatches of drive amplitude. A simple perturbative argument suggests that the steady-state blockade may be lost when $|\delta\lambda_1| \simeq \gamma_{slow}/\kappa$, i.e., even when $|\delta\lambda_1| \ll 1$. This fragility may make the steady-state effect difficult to achieve.

This small dissipative gap, while affecting infinite-time blockade, however, does not render the finite-time blockade presented above fragile. Instead, for an imperfect system that starts from vacuum, there is a distinct metastable regime of relevance whose dynamics is controlled by a new timescale unrelated to $1/\gamma_{slow}$. The relevant rate $\Gamma_{esc}$ now corresponds to a slow escape from the blockaded subspace. For imperfect amplitude matching ($\delta\lambda_1 \neq 0$), there is a weak coupling between blockaded and un-blockaded subspaces. Once in the un-blockaded subspace, the system can eventually populate the weakly metastable, high-amplitude state. While this escape destroys the blockade and results in a very large average photon number in the steady state (infinite-time limit), this corruption occurs over a very slow timescale $1/\Gamma_{e}$, and would only minimally affect the finite-time blockade dynamics.

The escape rate $\Gamma_{esc}$ can be estimated using a Fermi's Golden Rule (FGR) argument where $\delta\lambda_1$ (the imperfection in the single photon drive amplitude) is treated as a perturbation. This is consistent with the numerically observed behaviour that the average intracavity photon number approaches its steady-state value exponentially. Defining $\delta\tilde{\Lambda}_1 = \tilde{\Lambda}_3 \times \delta\lambda_1$, an approximate FGR calculation yields (FGR process is provided in more detail below in a separate section):

$$\Gamma_{esc} = c\frac{|\delta\tilde{\Lambda}_1|^2}{\kappa}, \quad (14)$$

with c is a dimensionless number. While in general it will depend on other parameters in the unperturbed Hamiltonian, for $\kappa \gg \tilde{\Lambda}_3$, it may be found that it is constant: c=1. In contrast, for the regime of interest $\kappa \sim \tilde{\Lambda}_3$, a simple analytic estimate is not possible. It may, however be found from numerics in this regime (i.e. by fitting the long-time relaxation of the average photon number shown in 36 of FIG. 7 that $c \approx 0.25$ in this regime. The overall form of $\Gamma_{esc}$ reflects two basic facts: the cavity can only leave the blockade subspace through the very small matrix element $\propto \delta\tilde{\Lambda}_1$, and the cavity must jump into energy eigenstates which are not localized to the Fock state $|2\rangle$ but spread out in Fock space and thus harder to jump into. The latter effect leads generically to c<1.

The slow escape rate $\Gamma_{esc}$ defines a time window over which the blockaded subspace is isolated from the rest of Hilbert space. In order to prepare Fock states, one just needs this time to be long compared to inverse drive amplitudes.

In practice, this leads to the weak constraint on drive-amplitude matching $\delta\lambda_1 < 1$. This is to be contrasted against the exponentially more demanding condition needed for blockade physics in the steady state, $\delta\lambda_1 < \gamma_{slow}/\kappa$. The vast difference in these conditions means that our blockade mechanism is with reach of various experimental platforms, whereas in contrast the steady-state version of the effect may be impractical.

The Fock state generation using the dynamics of Equation (4) for times much shorter than the full relaxation time of the system is described with respect to infinite-time steady state in further detail below.

Figure 8:
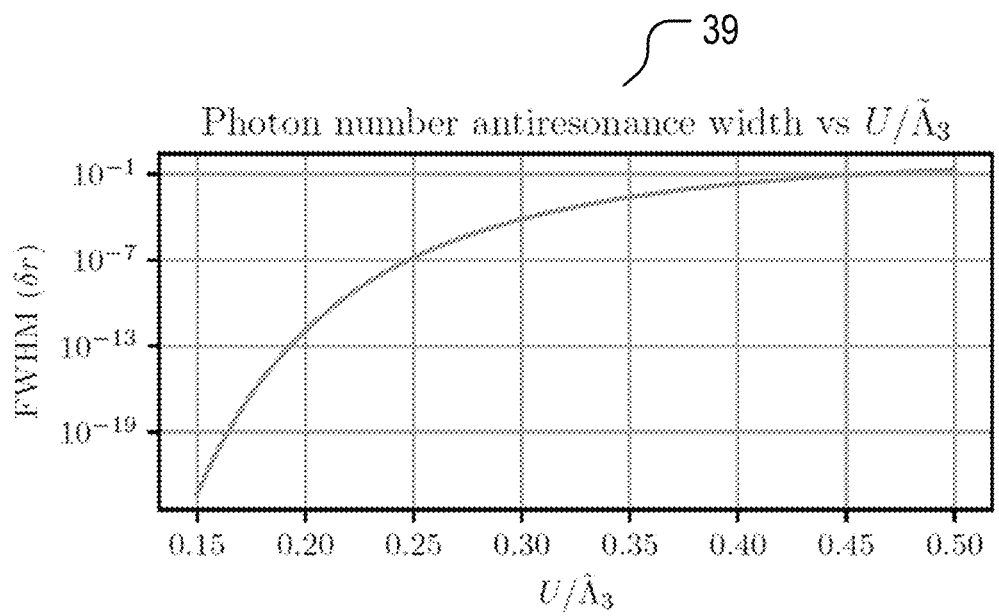
FIG. 8 illustrates calculated full width at half maximum of a steady-state photon number at a single-photon blockade anti-resonance as a function of a ratio between a cavity nonlinearity and nonlinear drive.

As discussed above, when r is exactly tuned to an integer, the steady-state exhibits blockade: the steady-state photon number distribution truncates at n=r. This blockade phenomena may be lost even for extremely small deviations of r away from an integer. This manifests itself as an anti-resonance phenomena when the average photon number in the steady state, $\langle \hat{n} \rangle_{ss}$ is plotted versus r. There appear to be a sharp dip in this quantity when r is an integer, with the width of these features $\Delta r \ll 1$. This behavior is illustrated in 39 FIG. 8, where a full-width half-max $\Delta r$ for the anti-resonance in $\langle \hat{n}(r) \rangle_{ss}$ centered at r=1 is plotted as a function of $\tilde{\Lambda}_3/U$. The plot shows an exponential dependence on this parameter. Away from the blockade point r=1, the steady-state photon number is approximately constant and has a large value $\gg 1$.

Both the large average steady-state photon number away from integer r, and the extremely small anti-resonance widths can be understood starting with a semiclassical analysis, which reveals a large-amplitude metastable state. The semiclassical equation of motion for the amplitude $\alpha = \langle \hat{a} \rangle$ that follows from Eq. (4) is:

$$\frac{d}{dt}\alpha = -2iU\alpha^*\alpha^2 - 2i\tilde{\Lambda}_3\alpha^*\alpha - i\tilde{\Lambda}_3\alpha^2 + i\tilde{\Lambda}_3 r - \frac{\kappa}{2}\alpha \tag{15}$$

For r=0 (nonlinear drive only) and $\kappa=0$, the steady-state solutions to this equation are $\alpha_0=0$ (with multiplicity 2) and $$\alpha_{ha} = -\frac{3\tilde{\Lambda}_3}{2U}. \tag{16}$$

Because a regime where $U \ll \tilde{\Lambda}_3$ is assumed, this amplitude is typically very large. Including non-zero $\kappa$ and r, it can be found that the first-order correction to this amplitude is small. To first order, it may be obtained that $$\alpha_{ha} = -\frac{3\tilde{\Lambda}_3}{2U} - \frac{i\kappa}{2\tilde{\Lambda}_3} + \frac{2U}{9\tilde{\Lambda}_3}r. \tag{17}$$

It may also be confirmed that this is an accurate description of the large-amplitude state by numerically finding the fixed points to Equation (15) without assuming small r, $\kappa$.

It may be further shown that this semiclassical solution may be stable by performing a standard linear stability analysis of the semiclassical equations. The eigenvalues of the linearized equations of motion for $\alpha$ and $\alpha^*$ about $\alpha_{ha}$ are $$\lambda_{\pm} = -\frac{\kappa}{2} \pm i3\sqrt{3}\frac{\tilde{\Lambda}_3^2}{2U}\left(1 - \frac{8}{27}\frac{U^2}{\tilde{\Lambda}_3^2}r\right) \tag{18}$$

which have negative real parts, indicating linear stability at the semiclassical level. Turning to the quantum problem, this system always has a unique steady state, which for integer r, may be a blockaded state. Hence, for integer r, the above semiclassically-stable state is only unstable due to quantum effects (i.e. precisely the blockade physics we have described, which is intimately tied to the discreteness of photon number).

Returning to the quantum problem, it may be found that upon numerically diagonalizing $\hat{H}_{block}$ in Eq. (1), there may be an eigenstate $|\Phi\rangle$ with photon number $\langle \hat{n} \rangle \approx |\alpha_{ha}|^2$ where $\alpha_{ha}$ is given by Eq. (18). Focusing on the single photon blockade, r=1, the Liouvillian Eq. (4) may be diagonalized, which reveals that there is generically a single nonzero eigenvalue $\gamma_{slow}$ which is significantly smaller than $\kappa$; all other decay rates are of order $\kappa$ or larger. It can be shown that this eigenvalue corresponds to the decay of the Hamiltonian eigenstate $|\Phi\rangle$ and that the value is exponentially small in $\tilde{\Lambda}_3/U$.

Working under the assumption that $|\Phi\rangle$ is the state whose decay is given by the Liouvillian eigenvalue $\gamma_{slow}$, a first order degenerate Liouvillian perturbation theory may be used to estimate $\gamma_{slow}$. The exact eigenstates within the single photon blockade manifold $\{|0\rangle, |1\rangle\}$ are given by $$|\psi_{\pm}\rangle = \frac{1}{\sqrt{2}}(|0\rangle \pm |1\rangle); \quad E_{\pm} = \mp\tilde{\Lambda}_3. \tag{19}$$

These eigenstates span the $\{|0\rangle, |1\rangle\}$ manifold so that $\langle 0|\Phi\rangle = \langle 1|\Phi\rangle = 0$. Using the numerically computed $|\Phi\rangle$, it may be found that it is reasonably well approximated by the coherent state $|\alpha_{ha}\rangle$ with overlap $|\langle \alpha_{ha}|\Phi\rangle|^2 > 0.96$ for $U \ll \tilde{\Lambda}_3$. An orthogonality with the blockade eigenstates Eq. (19) may be enforced which provides the approximate eigenstate $$|\phi\rangle = \frac{1}{\mathcal{N}}(|\alpha_{ha}\rangle - e^{-\frac{1}{2}|\alpha_{ha}|^2}|0\rangle - \alpha_{ha}e^{-\frac{1}{2}|\alpha_{ha}|^2}|1\rangle) \tag{20}$$

where $\mathcal{N}$ is the normalization constant. Under the assumption that $|\phi\rangle$ is an approximate eigenstate of $\hat{H}_{block}$, the relevant three-eigenstate degenerate manifold of the unperturbed Liouvillian $\mathcal{L}_0 = -i[\hat{H}_{block}, \bullet]$ is $\{|v_+\rangle\langle v_+|, |v_-\rangle\langle v_-|, |\phi\rangle\langle \phi|\}$. (The third exact eigenstate is $|\Phi\rangle\langle\Phi|$ of course.) The perturbation is single photon loss $$\mathcal{L}_1 = \kappa \mathcal{D}[\hat{a}] \tag{21}$$

where $\mathcal{D}[\hat{X}]$ is the standard Lindblad dissipator. The three state subspace with respect to $\mathcal{L}_1$ may be diagonalized to compute the eigenvalues. The irrelevant eigenvalues are $\gamma_0=0$, whose eigenvector is the $\kappa \ll \tilde{\Lambda}_3$ limit of the single photon blockade steady state, and $\gamma_1=\kappa/2$, whose eigenvector describes population imbalance relative to the steady state. The final eigenvalue is the only one whose eigenvector involves $|\phi\rangle\langle\phi|$ and for $U \ll \tilde{\Lambda}_3$ may be given by $$\gamma_{slow} \approx \kappa |\alpha_{ha}|^2(1+2|\alpha_{ha}|^2)e^{-|\alpha_{ha}|^2}. \tag{22}$$

This shows that the dissipative gap of the blockade Liouvillian spectrum may be exponentially small in $U/\tilde{\Lambda}_3 \ll 1$ due to a quasistable eigenstate of the coherent Hamiltonian. The description above thus provides a quantitative and intuitive understanding of the sensitivity of the steady state to small deviations of r away from integer values, explaining the sharp anti-resonance phenomena. Estimation of $\Gamma_{esc}$ Further details are provided below on how to use Fermi's Golden Rule (FGR) to estimate the slow rate $\Gamma_{esc}$ (Equation ((14)) which governs escape from the blockaded subspace in the presence of imperfect drive amplitudes. Consider first the simple case where $\kappa \ll \tilde{\Lambda}_3$. The system Hamiltonian can be written as $\hat{H}=\hat{H}_0+(\delta \tilde{\Lambda}\hat{a}^\dagger+h.c.)$, where $\hat{H}_0$ is the ideal Hamiltonian with perfect drive amplitude matching (i.e. $\hat{H}_0 = \hat{H}_{target}$ with r=1, c.f. Eq. (5)). Treating the last term as a perturbation, and letting $|\phi_j\rangle$ ($E_j$) denote eigenstates (eigenvalues) of $\hat{H}_0$, application of FGR yields $$\Gamma_{esc} = \sum_{j \in \{unblock\}} |\langle \phi_j | \delta \tilde{\Lambda}_1 \hat{a}^\dagger | \phi_\pm \rangle|^2 \frac{\gamma_j/2}{(\Delta E)^2 + \gamma_j^2/4}. \quad (23)$$

Here $|\phi_\pm\rangle$ are the two blockade-subspace eigenstates of $\hat{H}_0$, and $\Delta E = E_j - E_\pm$. Note that only final states in the unblockaded subspace are included. When the energies and decay rates are expressed in units of $\kappa$, this expression can be put into the form $\Gamma_{esc} = c|\tilde{\Lambda}_1|^2/\kappa$. The last factor in Eq. (23) corresponds to the lifetime-broadened density of states of each unblockaded eigenstate; for weak $\kappa$, the decay rate $\gamma_j = \kappa \langle \phi_j | \hat{a}^\dagger \hat{a} | \phi_j \rangle$. This general form matches that of Equation (14), with a prefactor c that in general depends on the unblockaded eigenstates of $\hat{H}_0$ and hence $U/\tilde{\Lambda}_3$. A good agreement between Equation (23) (computed from exact diagonalization) and the rate extracted from numerical simulations of the system dynamics for weak K may be found. As an example, $\tilde{\Lambda}_3=100$, may be considered. For $U/\tilde{\Lambda}_3=0.2$, the estimate is c=0.0051 and the extracted value from the numerics is c=0.0047, and for $U/\tilde{\Lambda}_3=0.3$ the estimate is c=0.0036 and the extracted value is c=0.0045. These are typical of this parameter regime. The small value of c here directly reflects the delocalization of the unblockaded eigenstates.

For more general regimes, it is trickier to directly apply FGR, as one can no longer treat the effects of $\kappa$ by simply lifetime broadening each unperturbed eigenstate. For $\kappa \gg$, on can use the fact that the large dissipation will disrupt the formation of coherent eigenstates outside the blockaded subspace. In this case, $\Gamma_{esc}$ may be estimated by considering a transition from either $|\phi_\pm\rangle$ to the Fock state $|2\rangle$, whose decay rate is simply $2\kappa$. This leads to an approximate decay rate corresponding to Equation (14) with parameter-independent constant c=1. For the most relevant regime $\kappa \sim \tilde{\Lambda}_3$, it is difficult to rigorously calculate the decay rate as neither $\kappa$ nor the unblockaded coherent dynamics can be treated perturbatively. numerically a good agreement can be found to the general form in Equation (14) with c~0.25. Heuristically, this is consistent with the results presented above; the slightly smaller value of c corresponds to the partial delocalization of unblockaded eigenstates.

In the limit $K \gg \tilde{\Lambda}_3$, the strong $\kappa$ will cause states with populations of high number Fock states to rapidly decay. This implies that any eigenstates of the Hamiltonian with significant population of the $|2\rangle$ Fock state will be heavily localized in Fock space near $|2\rangle$. Therefore an assumption may be made that Fock state $|2\rangle$ is a valid final eigenstate to which the cavity jumps. Using as the initial state either of the blockade eigenstates $|\phi_\pm\rangle = (|0\rangle \pm |1\rangle)/\sqrt{2}$, and estimating the final density of states as the amplitude decay rate $\rho(E_f)=1/\kappa$ of $|2\rangle$ (the energy difference is $\ll \kappa$), the escape rate may be arrived at:

$$\Gamma_{esc} = \frac{|\tilde{\Lambda}_1|^2}{\kappa}. \quad (24)$$

Thus c=1 in this limit. it is expected that this to be an upper bound on c because the energy eigenstates of the blockade Hamiltonian Equation (5) which have significant $|2\rangle$ populations are highly delocalized in Fock space. This implies that the matrix elements will be smaller and that the decay rates of the final states will be larger than what we have estimated here. Together these imply a smaller $\Gamma_{esc}$.

In the limit $\kappa \ll \tilde{\Lambda}_3$, the Hamiltonian eigenstates may not be perturbed much by the loss, thus the exact energy eigenstates in the Fermi's Golden Rule matrix elements may be used. While there are no analytic expressions for these but they may be obtained numerically by exact diagonalization. Generically a few eigenstates with large $|2\rangle$ population may be identified and they may be all very delocalized in Fock space, but relatively close in energy to the unblockaded eigenstates $|\phi_{35}\rangle$. Treating $\kappa$ as a perturbation, the first order decay rate of each state $|\phi_j\rangle$ may be computed as:

$$\gamma_j = \kappa \sum_{k \neq j} |\langle \phi_k | \hat{a} | \phi_j \rangle|^2. \quad (25)$$

Using these decay rates and the unperturbed energies of the eigenstates, the escape rate may be further estimated as already shown above in Equation (23)

Photon Blockade with Weak Drive

The short-time blockade dynamics considered above requires $\tilde{\Lambda}_3 > \kappa$. Via Equation (8), it can be seen that this is possible even if $U \ll \kappa$, as long as a large displacement $\alpha_b$ is used. While at a fundamental level such large displacements pose no problems, at a practical level they can create issues. This can be seen explicitly in the process of transforming the displaced-frame Fock states produced by Equation (5) to true lab-frame Fock states.

Given this possible concern, it may also be relevant to describe the dynamics of system where $|\tilde{\Lambda}_3| \ll \kappa$, a regime that could be reached with small U and modest displacements $\alpha$. Consider first the case where the drive amplitudes are perfectly matched, implying r=1 in Equation (5). In this case, the system approaches the infinite-time, perfectly-blockaded steady state on a timescale $\sim 1/\kappa$. This state has zero probability for having more than one photon, and the single photon occupancy may be expressed as $$\langle 1|\hat{\rho}(t \to \infty)|1\rangle = \frac{4|\tilde{\Lambda}_3/\kappa|^2}{1 + 8|\tilde{\Lambda}_3/\kappa|^2}. \quad (26)$$

Figure 9:
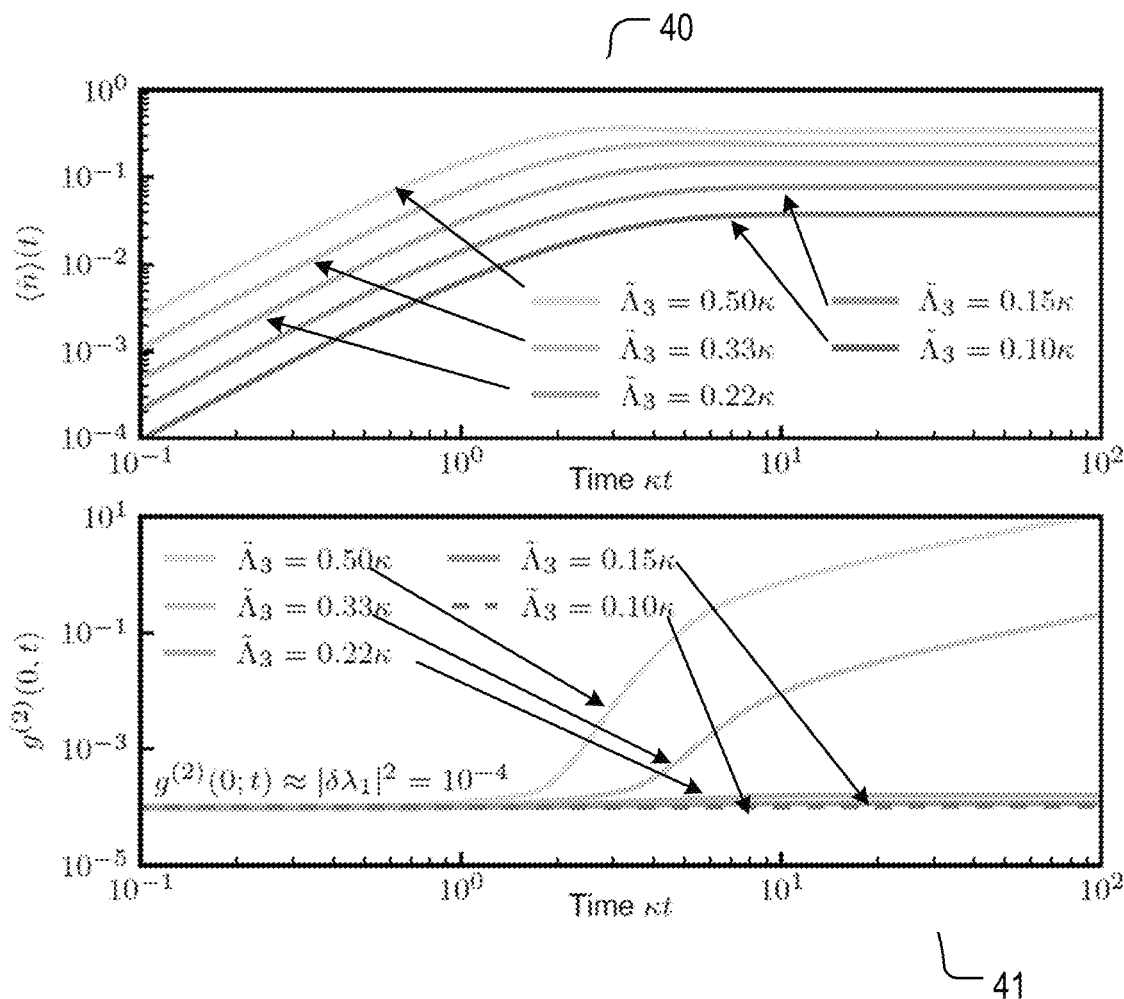
FIG. 9 illustrates example photon blockade dynamics with weak drive.

Hence, having a weak $\tilde{\Lambda}_3/\kappa$ does not break the blockade, but just reduces the population of the one photon state. In this weak drive regime, the blockade is much more robust to amplitude mismatch errors. FIG. 9 illustrate example photon blockade dynamics with a weak drive. A resource requirement of the blockade scheme described above maybe greatly reduced if one only tries to achieve a nonlinear drive $\tilde{\Lambda}_3 \ll \kappa$. Graph 40 of FIG. 9 plots the average intracavity photon number versus time for an imperfect drive amplitude matching $\delta\lambda_1$ for different $\tilde{\Lambda}_3 \ll \kappa$, and shows the transition from the underdamped regime $\tilde{\Lambda}_3 > \kappa/4$, where coherent oscillations are visible, to the overdamped regime where the cavity exponentially relaxes to the steady state. The robustness of the overdamped blockade is shown in 41 in FIG. 9, where the instantaneous intracavity $g^{(2)}(0; t)$ of the overdamped blockade as a function of time remains near the amplitude-mismatch-limited value $g^{(2)}(0; t)=|\delta\lambda_1|^2$ given by Equation (12) for long times even as the underdamped blockade experiences a large rise in $g^{(2)}(0; t)$ for times $\kappa t \sim 1$. For FIG. 9, it is assumed that $U=0.075\kappa$.

Numerical Results

Based on the example three-step protocol and other photon blockade dynamics described above, a numerically simulation of the performance the example three-step protocol may be generated. In particular, the Step 2 may be modeled by evolving the cavity system as per the full master equation in Equation (4)). The possibly imperfect displacement operations in steps 1 and 3 may be further modeled as a combination of a perfect displacement and the injection of thermal noise (corresponding to $\bar{n}_{th}$ thermal quanta). Formally, this corresponds to a Gaussian additive noise channel. This additive thermal noise may rapidly degrades the blockade. Starting with a perfect Fock state $|1\rangle$ and adding $\bar{n}_{th}$ thermal quanta (via an additive Gaussian noise channel), it may be shown that $g^{(2)}(0) \geq \bar{n}_{th}$.

In addition to displacement errors, drive amplitude mismatches discussed above may be further considered. A full Fock state generation protocol may be performed with small $\delta\lambda_1 \neq 0$. The figure of merit for the Fock state generation protocol may be the instantaneous second order coherence $g^{(2)}(0)$ at the end of the protocol as a function of $U/\kappa$.

Figure 10:
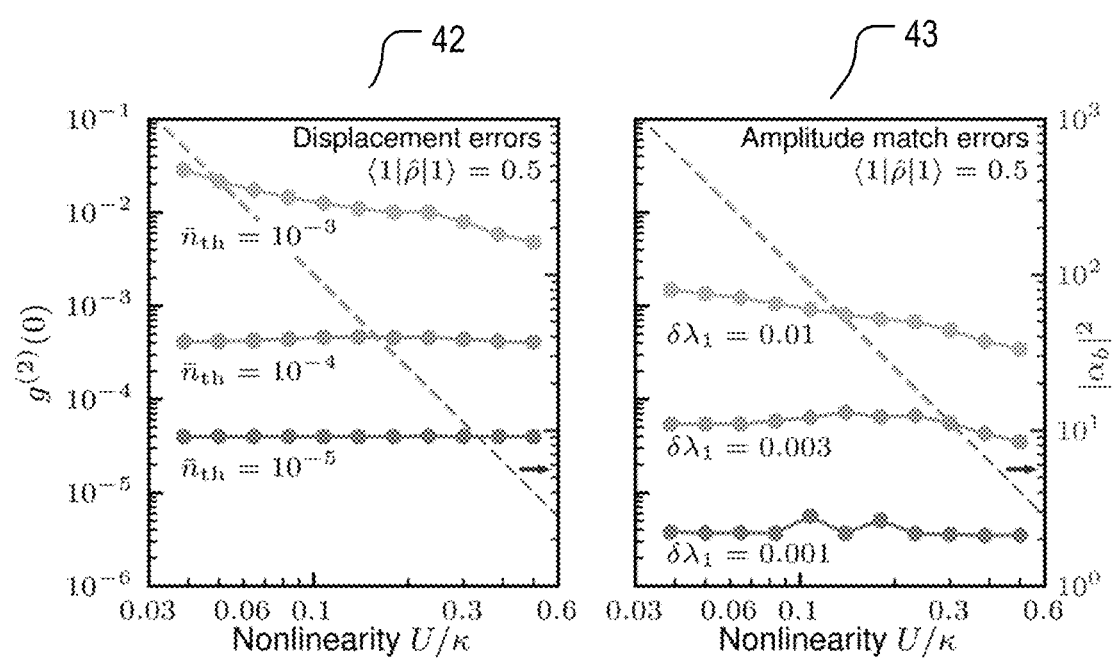
FIG. 10 illustrates numerical simulation of performance of an example photon Fock state generation protocol including imperfections.

Shown in FIG. 10 are numerical simulations of a full time-dependent protocol for various choices of $U/\kappa$ is indicated by $g^{(2)}(0)$ as a function of $U/\kappa$. In each case of 42 (showing simulation with imperfection in initial and final displacement operations) and 43 (showing simulation with imperfection in drive-amplitude matching), parameters are chosen to produce (in the ideal case) a state where the blockaded state has $\langle 1|\hat{\rho}|1\rangle = 0.5$. The numerical results show that the blockade protocol is effective even for $U/\kappa \sim 0.03$, and moreover, is robust against both small displacement errors and small amplitude match errors. There is no fundamental limit against applying our protocol for even smaller values of U. The dashed line sin FIG. 10 show intracavity photon number $|\alpha_b|^2 \sim \kappa/U)^2$ (right vertical axis) during the intermediate part of the protocol.

Multi-Mode Generalization and Preparation of Non-Gaussian Entangled States

The basic scheme in Eq. (1) may be further extended to a mechanism that allows the generation of entangled M-mode non-Gaussian photonic states using only weak nonlinearities $U \ll \kappa$. The disclosure below describe the extension to a M=2 mode system with lowering operators $\hat{a}_1$, $\hat{a}_2$. The additional implementations below realize the nonlinear driving Hamiltonian in Equation (1) in a displaced frame, but now the single-mode lowering operator a applies to a collective mode, e.g.

$$\hat{b} = (\hat{a}_1 + \hat{a}_2)/\sqrt{2} \tag{27}$$

The desired nonlinear driving Hamiltonian may be $$\hat{H}_{block2} = \tilde{\Lambda}\hat{b}\dagger(\hat{b}\dagger\hat{b}-r) + h.c. \tag{28}$$

The description below focus on realizing a single-excitation state, and hence take r=1. Following the various principles above, the ideal dynamics under this Hamiltonian can prepare a single excitation in the collective b mode. If the photon number of each $a_1$, $a_2$ mode is used to separately encode, for example, m a quantum bit (qubit), then the single excitation state produced may be a maximally entangled Bell state $(|10\rangle + |01\rangle)/\sqrt{2}$.

The Hamiltonian in Equation ((28) amounts to simply replacing $\hat{a}$ in Equation (1) of the main text with the collective mode $\hat{b}$. It thus immediately follows that if the four-wave mixing Hamiltonian Equation (3) is taken and $\hat{a}$ is replaced with $\hat{b}$, then the resulting Hamiltonian is equivalent to Equation (28) up to unitary displacement operators of modes $\hat{a}_1$ and $\hat{a}_2$.

Given the above, a simple substitution in Equation (3) yields the required form of the starting two-mode Hamiltonian $$\hat{H}_{RWA,2} = U\hat{b}\dagger\hat{b}\dagger\hat{b}\hat{b} + \Delta\hat{b}\dagger\hat{b} + (\Lambda_1\hat{b}\dagger + \Lambda_2\hat{b}\dagger\hat{b}\dagger + h.c.). \tag{29}$$

where again $\hat{b}$ is given by Equation (27). The linear and quadratic terms that are generated describe linear drives on both modes, detuning and beam-splitter couplings, and parametric drives (both degenerate and non-degenerate). The nonlinear four-wave mixing terms take the form $$\hat{H}_{RWA,2,U} = \frac{U}{2}\left(\sum_{j,k=1}^{2} \hat{a}_j^\dagger \hat{a}_k^\dagger \hat{a}_j \hat{a}_k + \left(\hat{a}_1^\dagger \hat{a}_1^\dagger \hat{a}_2 \hat{a}_2 + h.c.\right)\right) \tag{30}$$

Note that now both self and cross Kerr interactions and four-wave mixing processes that exchange interactions between modes 1 and 2 may be required.

Following the principles described in various sections above, each mode $\hat{a}_j$ may be displaced by the amplitude $\alpha_b$, given in Equation (8). By further tuning the parameters the drive parameters $\Lambda_1$, $\Lambda_2$ and detuning parameter $\Delta$ as per Eqs. (9), the above two-mode Hamiltonian is unitarily equivalent to the desired two-mode blockade Hamiltonian in Eq. (28). The basic ideas may thus be generalized directly to multimode systems. Other related approaches are also possible. While the introduction of modes does involve more complexities, the basic feature of the original scheme remains: generation of non-classical blockaded (now entangled) states is possible even if the four-wave mixing nonlinearities U are much weaker that photonic loss.

Practical Implementations

The disclosed Fock state generation scheme is generic: there are many different kinds of systems that can realize weakly-nonlinear electromagnetic modes with one- and two-photon drives. In the context of weakly nonlinear optical cavities, the primary implementation challenge is the large cavity displacements required, $\alpha_b \sim \kappa/U$. For typical low-loss silicon micro-resonators, the intrinsic $\chi^{(3)}$ nonlinearity yields $U/\kappa \sim 10^{-8}$. The $\chi^{(3)}$ of silicon nitride may be smaller. While the large displacements and intracavity powers required in such systems to achieve $\alpha_b \sim \kappa/U$ may be possible given the pulsed nature of the example disclosed scheme, a route of the general ideas in the "Photon blockade with weak drive" section may be followed. Here, displacements much smaller than $\kappa/U$ may be used, making constraints on power handling much more reasonable. This may result in a perfect blockade and states with vanishingly small $g^{(2)}(0)$. The resulting average photon number may be small but the Fock state so generated have a strong advantage over other existing approaches that only generate Gaussian state and have non-zero population of higher Fock states.

An alternative route for implementation in optical cavities would be to utilize $x^{(2)}$ nonlinearities in materials with broken inversion symmetry like silicon nitride or aluminum nitride. These nonlinearities may be parametrically larger than the corresponding $x^{(3)}$. While the scheme above is suitable for a Kerr-type four-wave mixing nonlinearity, this can be achieved starting with three-wave mixing $x^{(2)}$ processes that generates a nonlinear coupling to a detuned auxiliary mode. To second order in this coupling, a desired self-Kerr interaction U needed for our scheme may be generated. Despite being second order, this can still be orders-of-magnitude larger than an intrinsic $x^{(3)}$ nonlinearity.

While optical cavities are one possible domain of application, they are not the only candidate. The implementations above can also be exploited in parametrically-driven nano-mechanical systems with weak intrinsic Duffing nonlinearities, as well as in microwave cavity systems. A current trend in quantum information processing with superconducting circuits is to store and process information in high-Q microwave cavities. In such schemes, detuned qubits are often used to induce weak nonlinearities in the principle bosonic modes. A key limitation in these approaches is that the qubit also induces new loss mechanisms. The scheme above provides a path to circumvent this limitations in existing approaches. One could use extremely large qubit-cavity detunings, resulting in both very weak induced cavity nonlinearities, but also weak induced dissipation. The disclosure above shows that such weak nonlinearities could still be harnessed to produce non-classical states using the disclosed implementations.

As such, a new basic route to generating photonic states that are blockaded is described: they have a sharp cutoff in their photon-number distribution, having zero probability to have more than r photons in the state. This is accomplished by using standard tools (a weak Kerr nonlinearity, one and two photon drives) to realize an effective non-linear drive (Equation (5)). In stark contrast to the well-studied unconventional photon blockade mechanism, the scheme and implementations described above can generate truly blockaded states, and states that do not need to be infinitely close to being vacuum. In principle, the basic mechanism is effective even for arbitrarily weak nonlinearities $U \ll \kappa$. In practice, limitations will arise from the inability to perfectly match the one and two photon drive amplitudes, and the inability to apply the required displacement transformations perfectly. The scheme disclosed above can be effective even if these imperfections are present.

While the above description focuses on generating states that approximate single-photon Fock states, the underlying principles are much more general. By picking the parameter r in Equation (5) to be an integer larger than one (which then influences the choice of drive amplitudes via Equations ((9a)) and ((9b))), one can generate higher-order blockaded states: states that are confined to the manifold spanned by Fock states $|0\rangle, |1\rangle, \ldots, |r\rangle$. Further, the same basic idea can used to generate non-classical, multi-mode entangled states. One again realizes the nonlinear driving Hamiltonian in Equation (5) in a displaced frame, but now the mode a is actually a collective mode of 2 or more distinct cavity modes. Generating â Fock state in this collective mode directly corresponds to a W-style entangled state.

The mechanism disclosed herein may provide a tool for generating non classical photonic states in a variety of platforms where only weak nonlinearities are achievable. It could also conceivably be harnessed as a tool for quantum simulation, i.e., to realize models of strongly interacting photons. The underlying principles described above are compatible with a wide variety of bosonic systems, including optical and microwave cavities, as well as more general superconducting circuit QED setups. For example, the resonant cavity in the optical spectral range may be implemented as Fabry-Pérot resonator, optical ring resonator, and the like.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Further, the terms "cavity," "resonant cavity," "resonance cavity," and "resonator" are used interchangeably in the disclosure above. A cavity or resonator may be characterized by multiple resonant modes. The implementations above may be applied to generation of Fock states in one of the multiple resonance modes independent of other resonant modes. The terms "resonance mode," "resonant electromagnetic mode," "resonant mode," and the like are used interchangeably.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed:

1. A method for generating a non-classical photonic Fock state in a resonant electromagnetic mode of a nonlinear electromagnetic resonator, comprising:
   adjusting and applying a first electromagnetic drive in a first time period to displace the resonant electromagnetic mode from a lab frame into a displaced frame;
   adjusting and applying the first electromagnetic drive and a second electromagnetic drive in a second time period subsequent to the first time period to the nonlinear electromagnetic resonator to generate a photonic Fock state of the resonant electromagnetic mode in the displaced frame with photon number n by turning off a matrix element between photonic Fock states with photon numbers n and n+1, thereby creating a photon blockade between the photonic Fock states with photon numbers n and n+1; and
   adjusting and applying the first electromagnetic drive in a third time period subsequent to the second time period to restore the resonant electromagnetic mode into the lab frame from the displaced frame while maintaining the photonic Fock state.

2. The method of claim 1 wherein n=1 and the photon Fock state corresponds to a single-photon Fock state.

3. The method of claim 2, wherein:
   the first electromagnetic drive is detuned by a first frequency offset to a single photon resonance of the resonant electromagnetic mode of the nonlinear electromagnetic resonator; and
   the second electromagnetic drive is detuned by a second frequency offset to a two-phone resonance of the resonant electromagnetic mode of the nonlinear electromagnetic resonator, the second frequency offset being commensurate with the first frequency offset.

4. The method of claim 3, wherein amplitude of the first electromagnetic drive and a length of the first time period are adjusted such that the resonant electromagnetic mode is displaced into a coherent state at end of the first time period.

5. The method of claim 3, further comprising applying and adjusting the second electromagnetic drive during the first time period to assist in compensating for a consequence of a nonlinearity of the nonlinear electromagnetic resonator.

6. The method of claim 3, further comprising applying and adjusting the second electromagnetic drive during the third time period to assist in compensating for a consequence of a nonlinearity of the nonlinear electromagnetic resonator.

7. The method of claim 3, wherein a nonlinearity of the nonlinear electromagnetic resonator at the resonant electromagnetic mode is smaller in comparison to a photonic loss rate of the nonlinear electromagnetic resonator.

8. The method of claim 3, wherein a time length of the second time period is chosen to be inversely proportional to an effective drive amplitude of the second electromagnetic drive in the displaced frame.

9. The method of claim 3, wherein the nonlinear electromagnetic resonator is dominated at the resonant electromagnetic mode by Kerr-type ($x^{(3)}$) optical nonlinearity.

10. The method of claim 3, wherein the nonlinear electromagnetic resonator is dominated at the resonant electromagnetic mode by $x^{(2)}$ type of optical nonlinearity.

11. The method of claim 3, wherein the nonlinear electromagnetic resonator comprises a optical ring resonator or an optical Fabry-Pérot resonator.

12. The method of claim 1, wherein the first electromagnetic drive and the second electromagnetic drive during the first, second, and third time period effectively generate a Hamiltonian in a form of:

$$\hat{H}_{target} = (\tilde{\Lambda}_3 \hat{a}^\dagger (\hat{a}^\dagger \hat{a} - n) + h.c.) + U \hat{a}^\dagger \hat{a}^\dagger \hat{a} \hat{a},$$

where $\hat{a}$ and $\hat{a}^\dagger$ are cavity photon generation and annihilation operators of the resonant electromagnetic mode, U represents cavity nonlinearity, and $\tilde{\Lambda}_3$ represents a nonlinear drive amplitude, and wherein the Hamiltonian above describes a nonlinear driving process that can pump up an initial vacuum state of the nonlinear electromagnetic resonator to n-photon Fock state, but no higher.

13. The method of claim 1, further comprising outcoupling the photonic Fock state from the nonlinear electromagnetic resonator via an electromagnetic wave transport structure.

14. A system for generating a non-classical photonic Fock state; comprising:
   a nonlinear electromagnetic resonator having a resonant electromagnetic mode characterized by a resonant frequency and corresponding nonlinearity;
   a first electromagnetic source;
   a second electromagnetic source; and
   a controller circuitry configured to:
   control the first electromagnetic source to generate and apply a first electromagnetic drive to the resonant electromagnetic mode in a first time period to displace the resonant electromagnetic mode from a lab frame into a displaced frame;
   control the second electromagnetic source to generate and apply a second electromagnetic drive to the resonant electromagnetic mode in a second time period subsequent to the first time period to generate a photonic Fock state in the resonant electromagnetic mode with photon number n by turning off a matrix element between thereby creating a photon blockade between the photonic Fock state and a next higher photon number state with photon number n+1; and
   control the first electromagnetic source to generate and apply the first electromagnetic drive to the resonant electromagnetic mode in a third time period subsequent to the second time period to restore the resonant electromagnetic mode into the lab frame from the displaced frame while maintaining the photonic Fock state.

15. The system of claim 14 wherein n=1 and the photon Fock state corresponds to a single-photon Fock state.

16. The system of claim 15, wherein:
- the first electromagnetic drive is detuned by a first frequency offset to a single photon resonance of the resonant electromagnetic mode of the nonlinear electromagnetic resonator; and
- the second electromagnetic drive is detuned by a second frequency offset to a two-phone resonance of the resonant electromagnetic mode of the nonlinear electromagnetic resonator, the second frequency offset being commensurate with the first frequency offset.

17. The system of claim 16, wherein amplitude of the first electromagnetic drive and a length of the first time period are adjusted such that the nonlinear electromagnetic resonator is displaced into a coherent state of the electromagnetic mode at end of the first time period.

18. The system of claim 16, wherein the controller circuitry is further configured to apply and adjust the second electromagnetic drive during the first time period to assist in compensating for a consequence of a nonlinearity of the nonlinear electromagnetic resonator.

19. The system of claim 16, wherein the controller circuitry is further configured to apply and adjust the second electromagnetic drive during the third time period to assist in compensating for a consequence of a nonlinearity of the nonlinear electromagnetic resonator.

20. The system of claim 16, wherein a nonlinearity of the nonlinear electromagnetic resonator at the electromagnetic mode is smaller in comparison to a photonic loss rate of the nonlinear electromagnetic resonator.

\* \* \* \* \*